May 28, 1940.  W. E. SYKES  2,202,407
GEAR CUTTER
Filed Nov. 24, 1937  2 Sheets-Sheet 1
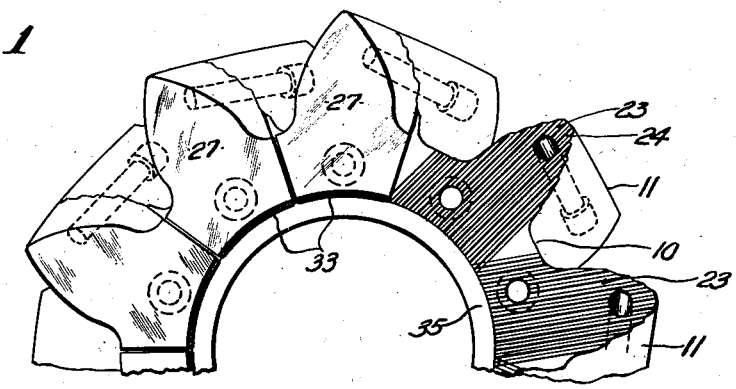
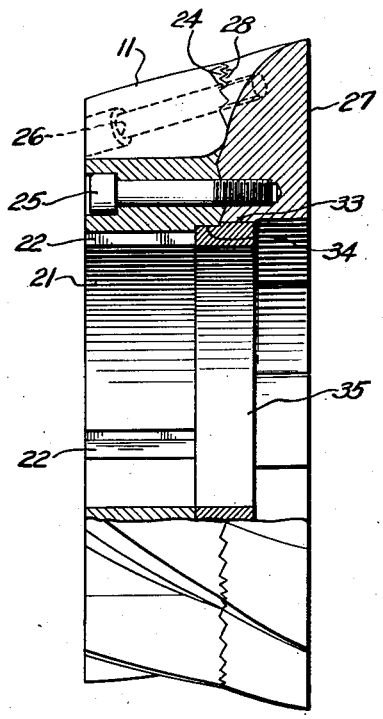
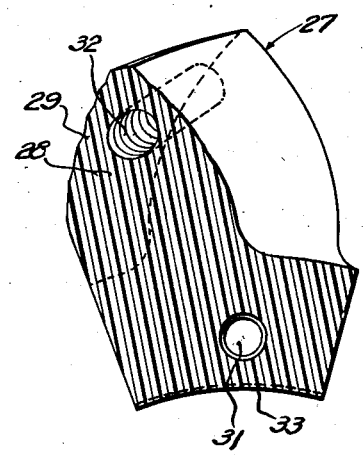
Inventor
William E. Sykes
By Albert R. Henry
Attorney May 28, 1940.  W. E. SYKES  2,202,407
GEAR CUTTER
Filed Nov. 24, 1937  2 Sheets-Sheet 2

Inventor
William E. Sykes
By Albert R. Henry
Attorney

Patented May 28, 1940

2,202,407

UNITED STATES PATENT OFFICE 2,202,407

GEAR CUTTER

William E. Sykes, Buffalo, N. Y.

Application November 24, 1937, Serial No. 176,282

2 Claims. (Cl. 29—102)

This invention relates to improvements in gear cutters of the type particularly adapted for use in gear shaping or planing machines.

The invention is specifically applicable to pinion types of generating cutters, such as may be used on the Sykes type of machine, and it is concerned with the application of removable cutter blades to the end faces of the teeth in the cutter body. The blades and cutter body are formed in such manner that when the blades are fastened by suitable securing screws, they are as rigidly secured as though they were integral portions of the cutter body.

In the gear cutting operation of the cutter, the variable shear loads between the blades and the cutter body are entirely taken up by the cooperative formation structure therebetween, while the holding screws, which are provided to removably secure the blades, perform their intended and sole duty of tension connections.

Other features of the invention reside in benefits derived from the simplicity of the blade structure, whereby hardening thereof is attained without risk of cracking, as has been prevalent in prior blades of more complex structure. Similarly, the simplicity and compactness of the connections permit repeated sharpening of the blades without affecting the strength of the blades or the rigidity of the connections.

In the drawings:

Fig. 1 is a fragmentary front view of a helical tooth cutter wherein several of the blades have been removed to show the cutter body structure;

Fig. 2 is a section on the line 2—2 of Fig. 1;

Fig. 3 is an enlarged rear view of a cutter blade;

Figure 4:
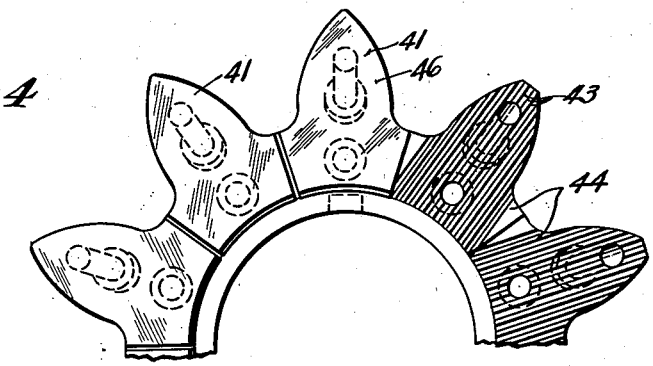
Fig. 4 is a fragmentary front view of a straight tooth cutter.

The cutter illustrated in Figs. 1 to 3 is of the helical type, and it consists of a body 10 having blade supporting teeth 11 and a central spindle opening 21, which includes keyways 22, by means of which the cutter is secured to a tool spindle forming part of a suitable gear generating machine (not shown).

The tooth faces 23 are each formed with a group of serrations 24, the serrations of each group being parallel, and the central serration of each group being preferably disposed radially with respect to the axis of the body. Individually, the serrations resemble an American standard thread in cross section, having a 60 degree included flank angle and a flattened apex. It is not intended to limit the invention to this formation, however, as, depending on the cutter proportions, it may be varied to resemble any known thread profile, ranging from the buttress to rectilinear forms. Each tooth 11 is drilled and counterbored to receive with some clearance a pair of securing screws 25 and 26.

A tool steel blade 27 is fitted and secured to each tooth face 23, and, as shown in Fig. 3, each blade is formed with a group of serrations 28 on its inner face 29, which are adapted to register accurately with the serrations 24 of the cutter body teeth. Each blade is provided with tapped holes 31, 32, for receiving screws 25 and 26.

After the several blades are assembled in the manner just described, the assembly is bored to provide circular faces 33 of the same curvature on all of the blades 27. The adjacent portion of the body 10 is simultaneously counterbored, as indicated by the numeral 34, to receive a pressed in ring 35. The blades are then rough generated to the desired profile and removed from the body, whereupon the serration groups of each blade and companion tooth face are individually lapped to obtain more accurate registration of the serrations.

The blades are finally reassembled with their faces 33 contacting the outer cylindrical face of the ring 35, which is pressed into the counterbore 34 after the lapping operation. The blades are finish ground to the precise involute shape required in a final operation.

In gear cutting service, the blades are subjected to loads of varying magnitude, depending on the depth of cut in the gear being shaped, and on the constantly varying angular cutting contact of each blade with reference to the gear. The radial components of such forces are resisted effectively by the backing of each blade afforded by the contacting ring 35, while other forces are resisted by the perfect bond obtained between the blades and the body by the serrations. The securing screws 25 and 26 are thus protected from shear loads in any direction, and their sole duty is to clamp the blades rigidly to the cutter body. As a result of this structure, the blades, in effect, are integrated with the body, and inaccuracy previously caused by loose blades is entirely avoided.

The outer faces 30 of the blades are periodically ground to sharpen the cutting edges, and thus the blades become progressively thinner until their replacement is necessary. In the present construction, over two-thirds of the thickness of the blades is available for sharpening before replacement, since the securing and staking means take up but little transverse space and are all located adjacent to or on the inner faces of the blades.

Figure 5:
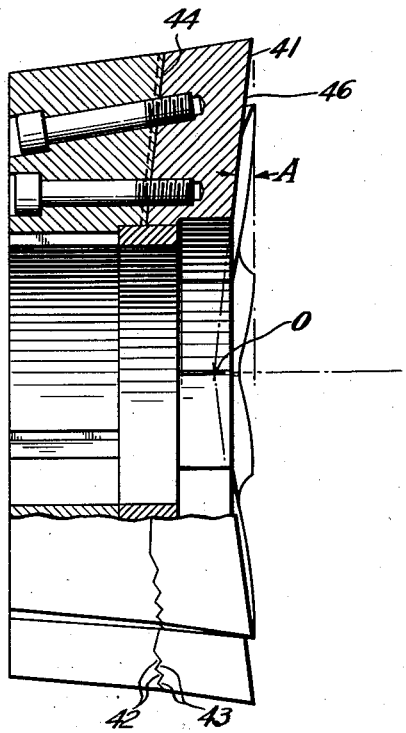
Fig. 5 is a section on the line 5—5 of Fig. 4.
Figure 6:
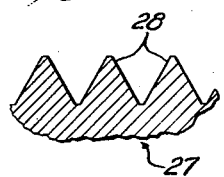
Fig. 6 is a section on the line 6—6 of Fig. 3.

In Figs. 4 and 5, a straight tooth cutter 40 is provided with blades 41 which are supplied with serrations 42 registering with complementary body tooth serrations 43 of a similar character to those of the first embodiment. In this construction the tooth faces 44 form the sides of a frustrum of a regular pyramid whose apex 0 lies in the axis of rotation of the cutter. The faces are thus inclined with respect to perpendiculars drawn from the axial line of the cutter.

The blades 41 are of uniform thickness, and when they are secured to the faces or facets 44 of the body teeth, their outer faces 46 are likewise inclined. This inclination, which is denoted by the angle A in Fig. 5, is sufficient to provide the desired rake to the cutting edges of the blades, and as it is obtained without the necessity of grinding or machining the tool steel blades, considerable labor is saved.

It will be apparent to those skilled in the machine tool arts that the invention is susceptible to various detailed modifications without departing from the principles set forth in the following claims.

I claim:

1. In a gear cutter of the pinion type, a body having a bore and coaxial peripheral teeth, a continuous cylinder pressed into the bore and projecting from one face of the body, blades applied to common end faces of the teeth, said blades each having a curved face seating on the exterior surface of said cylinder, complementary parallel serrations on the face of each tooth and its accompanying blade, said serrations being disposed in an approximately radial direction to prevent radial displacement of the blades on the cylinder, and means securing the blades to the tooth faces.

2. In a gear cutter of the pinion type, a body having a bore and coaxial peripheral teeth, common ends of the teeth having faces each equally inclined to a plane perpendicular to the axis of the body, a continuous cylinder pressed into the bore and projecting from one face of the body, blades applied to said end faces of the teeth, said blades each having a curved face seating on the exterior surface of the cylinder, complementary parallel serrations on the face of each tooth and its accompanying blade, said serrations being disposed in an approximately radial direction to prevent radial displacement of the blades on the cylinder, and means securing the blades to the tooth faces.

WILLIAM E. SYKES.